United States Patent
Kudo (10) Patent No.: US 10,120,186 B2
(45) Date of Patent: Nov. 6, 2018

(54) SCANNING MIRROR (71) Applicant: DISCO CORPORATION, Tokyo (JP)

(72) Inventor: Yu Kudo, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 15/400,274

(22) Filed: Jan. 6, 2017

(65) Prior Publication Data

US 2017/0205622 A1    Jul. 20, 2017

(30) Foreign Application Priority Data

Jan. 19, 2016    (JP) .................... 2016-007644

(51) Int. Cl.
*G02B 26/10* (2006.01)
*G02B 5/08* (2006.01)

(52) U.S. Cl.
CPC ......... *G02B 26/105* (2013.01); *G02B 5/0808* (2013.01)

(58) Field of Classification Search
CPC .................... G02B 26/105; G02B 5/0808

USPC ......... 359/212.1, 212.2, 213.1, 214.1, 226.2, 359/846–848

See application file for complete search history.

(56) References Cited

U.S. PATENT DOCUMENTS

| 9,759,993 | B2 * | 9/2017 | Desai | G03B 21/28 |
| 9,933,617 | B2 * | 4/2018 | Christensen | G02B 5/0808 |
| 2011/0317235 | A1 * | 12/2011 | Desai | G02B 26/085 |
| | | | | 359/212.1 |
| 2016/0161755 | A1 * | 6/2016 | Yonekubo | G02B 27/4227 |
| | | | | 345/8 |

FOREIGN PATENT DOCUMENTS

JP    2008-068270    3/2008

* cited by examiner

*Primary Examiner* — Frank Font
(74) *Attorney, Agent, or Firm* — Greer Burns & Crain Ltd.

(57) ABSTRACT

A scanning mirror includes a mirror base and a reflective film formed on the mirror base. The mirror base is formed from a non-metallic material having a specific rigidity, determined by Young's modulus (GPa) and density (g/cm$^3$), of at least 100 GPa·cm$^3$/g.

4 Claims, 7 Drawing Sheets

| Specimen | Material | Young's modulus (GPa) | Density (g/cm$^3$) | Specific Rigidity (GPa·cm$^3$/g) |
|---|---|---|---|---|
| 1 | Diamond | 1,000~1,100 | 3.516~3.525 | 283.6-312.8 |
| 2 | Sintered diamond | 776~920 | 3.9~4.1 | 189.3~235.9 |
| 3 | Silicon carbide | 420,360 | 3.0~3.2 | 112.5~140.0 |
| 4 | Sapphire | 350~470 | 4.0 | 87.5~117.5 |
| 5 | Quartz glass | 72~74 | 2.2 | 32.7~33.6 |

FIG.6

|  | Example 1 | Example 2 | Example 3 | Example 4 | Prior Art Example 1 | Example 5 | Example 6 | Example 7 |
|---|---|---|---|---|---|---|---|---|
| Material | Diamond | Sintered diamond | Silicon carbide | Sapphire | Quartz glass | Diamond | Sintered diamond | Silicon carbide |
| Specific rigidity(GPa·cm³/g) | 283.6 | 189.3 | 112.5 | 87.5 | 32.7 | 283.6 | 189.3 | 112.5 |
| Excitation frequency(kHz) | 7 | 7 | 7 | 7 | 7 | 10 | 10 | 10 |
| Value of f²·θ(krad/s²) | 427 | 427 | 427 | 427 | 427 | 873 | 873 | 873 |
| Amount of flexure(nm) | 65(1/10λ) | 100(1/6λ) | 150(1/4λ) | 300(1/2λ) | 700(1.1λ) | 130(1/5λ) | 220(1/3λ) | 300(1/2λ) |
| Determination | ○ | ○ | ○ | ○ | × | ○ | ○ | ○ |

|  | Example 8 | Prior Art Example 2 | Example 9 | Example 10 | Example 11 | Example 12 | Prior Art Example 3 |
|---|---|---|---|---|---|---|---|
| Material | Sapphire | Quartz glass | Diamond | Sintered diamond | Silicon carbide | Sapphire | Quartz glass |
| Specific rigidity(GPa·cm³/g) | 87.5 | 32.7 | 283.6 | 189.3 | 112.5 | 87.5 | 32.7 |
| Excitation frequency(kHz) | 10 | 10 | 14 | 14 | 14 | 14 | 14 |
| Value of f²·θ(krad/s²) | 873 | 873 | 1710 | 1710 | 1710 | 1710 | 1710 |
| Amount of flexure(nm) | 600(λ) | 1500(2.5λ) | 230(2/5λ) | 430(2/3λ) | 590(0.9λ) | 1100(1.5λ) | 2800(4.3λ) |
| Determination | × | × | ○ | ○ | ○ | × | × |

# SCANNING MIRROR

BACKGROUND OF THE INVENTION

Field of the Invention

The present invention relates to a scanning mirror.

Description of the Related Art

In laser scanning type confocal microscopes and the like, in general, a scanner apparatus, such as a galvano scanner and a resonant scanner, that has a scanning mirror is used. In addition, in the semiconductor device manufacturing process, formation of through-holes by applying a laser beam is conducted. For forming a multiplicity of through-holes at a high speed, a technology has been proposed in which formation of through-holes is performed while driving (exciting) a scanning mirror about an axis of a scanner apparatus at a high speed to deflect the direction of a laser beam at a high speed (see, for example, Japanese Patent Laid-open No. 2008-068270). In this type of scanning mirrors, conventionally, quartz glass is used as material for a mirror base, and a thin film of a metal such as aluminum or a multilayer film of a dielectric is formed as a reflective film on the mirror base.

SUMMARY OF THE INVENTION

Meanwhile, in relation to scanner apparatuses, a technology for driving a scanning mirror about an axis at a high speed (for example, a high frequency of 10 kHz or above) is desired. For driving a scanning mirror at a high speed, it is necessary to reduce the moment of inertia of the scanning mirror. When a scanning mirror having a small effective reflection range is used for reducing the moment of inertia, however, it is necessary for a laser beam for actual scanning to have a small beam diameter. As a result, bad influences such as shortening of service life due to accumulation of damages or a thermal lens effect may be exerted on optical elements such as mirrors or lenses for guiding light to the scanning mirror. Besides, as the beam diameter of the laser beam is reduced, numerical aperture (NA) is lowered, which would make it difficult to enhance energy density and to apply the laser beam to a wide region.

There have been attempts to fabricate a mirror base in a thin form by use of a low-density material, for the purpose of enlarging the effective reflection range of a scanning mirror and reducing the moment of inertia of the scanning mirror. Since quartz glass used conventionally is not a material that has a sufficient rigidity, flexure may be generated in the mirror base formed from quartz glass at the time of high-speed driving, leading to a lowered focusing characteristic. This problem becomes more conspicuous as the effective reflection range of the scanning mirror is enlarged, and as the scanning mirror is driven at a higher speed and in a wider angle.

Accordingly, it is an object of the present invention to provide a scanning mirror which is configured for restraining or suppressing flexure of a mirror base at the time of driving of the scanning mirror and for realizing an enhanced focusing characteristic.

In accordance with an aspect of the present invention, there is provided a scanning mirror including: a mirror base; and a reflective film formed on the mirror base, wherein the mirror base is formed from a non-metallic material having a specific rigidity, determined by Young's modulus and density, of at least 100 GPa·cm$^3$/g.

According to this configuration, it is possible to restrain or suppress flexure of a mirror base at the time of driving the scanning mirror at a high speed (for example, 10 kHz or above) and to realize an enhanced focusing characteristic. Therefore, it is possible to suppress a reduction in the size of the scanning mirror attendant on driving at a high speed, and to use a processing laser beam with a sufficiently large beam diameter for laser processing. As a result, an enhanced degree of freedom in design and a lowered cost as to light guiding optical elements can be realized, and an enhanced energy density owing to an enhanced NA at a processing point, as well as finer processing and wider-range processing, can be achieved.

In this configuration, the scanning mirror is preferably driven at a value of $f^2 \cdot \theta$ in a region of not less than 873 krad/s$^2$, where f (kHz) is an excitation frequency for driving the scanning mirror, and $\theta$ (rad) is a mechanical deflection angle of the mirror base. The non-metallic material is preferably diamond or silicon carbide. In addition, the mirror base is preferably used as a resonant scanner or a galvano scanner.

A scanner apparatus according to the present invention includes a scanning mirror that reflects a laser beam, and a drive unit that drives the scanning mirror about an axis, wherein the scanning mirror includes a mirror base, and a reflective film formed on the mirror base, and the mirror base is formed from a non-metallic material having a specific rigidity, determined by Young's modulus and density, of at least 100 GPa·cm$^3$/g.

In this configuration, the drive unit preferably drives the scanning mirror at a value of $f^2 \cdot \theta$ in a region of not less than 873 krad/s$^2$, where f (kHz) is an excitation frequency in driving the scanning mirror, and $\theta$ (rad) is a mechanical deflection angle of the scanning mirror.

Since the scanning mirror of the present invention includes the mirror base and the reflective film formed on the mirror base, and the mirror base is formed from a non-metallic material having a specific rigidity, determined by Young's modulus and density, of at least 100 GPa·cm$^3$/g, it is possible to restrain or suppress flexure of the mirror base at the time of driving the scanning mirror at a high speed (for example, 10 kHz or above) and to realize an enhanced focusing characteristic. Therefore, it is possible to suppress a reduction in the size of the scanning mirror attendant on driving at a high speed, and to use a processing laser beam with a sufficiently large beam diameter for laser processing. As a result, an enhanced degree of freedom in design and a lowered cost as to light guiding optical elements can be realized, and an enhanced energy density owing to an enhanced NA at a processing point, as well as finer processing and wider-range processing, can be achieved.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some modes (embodiments) for carrying out the present invention will be described in detail below, referring to the attached drawings. The present invention, however, is not to be limited to the following embodiments. Besides, the components described below include those which can be easily contemplated by one skilled in the art, and those which are substantially the same. Further, the configurations described below can be combined appropriately. In addition, various omissions, replacements or changes of configurations are possible without departing from the spirit or scope of the gist of the present invention.

Figure 1:
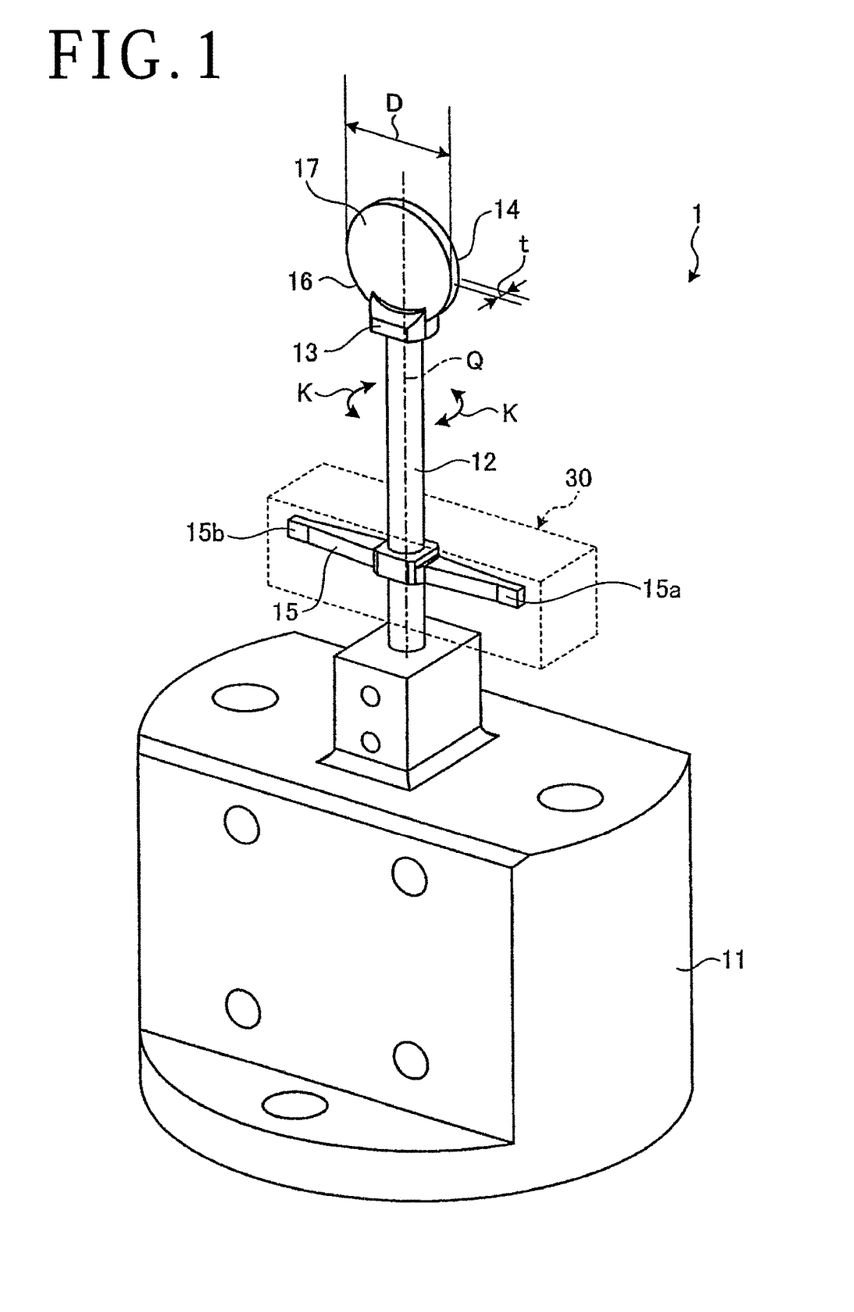
FIG. 1 is a perspective view showing a configuration example of a resonant scanner including a scanning mirror according to the present embodiment.
Figure 2:
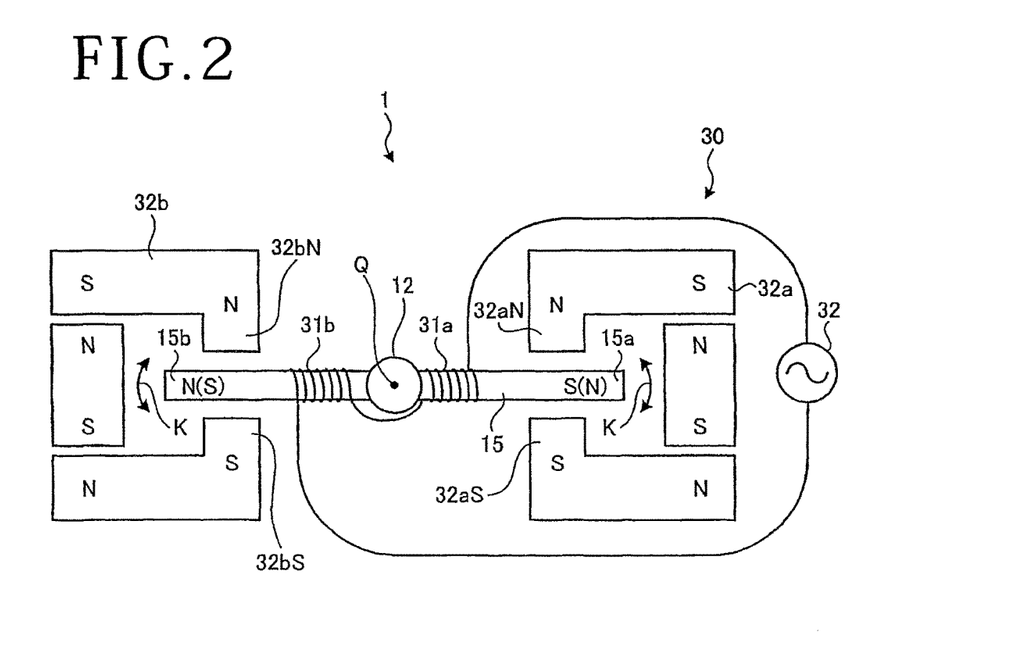
FIG. 2 is a schematic view showing a configuration example of a drive unit of the resonant scanner.
Figure 3:
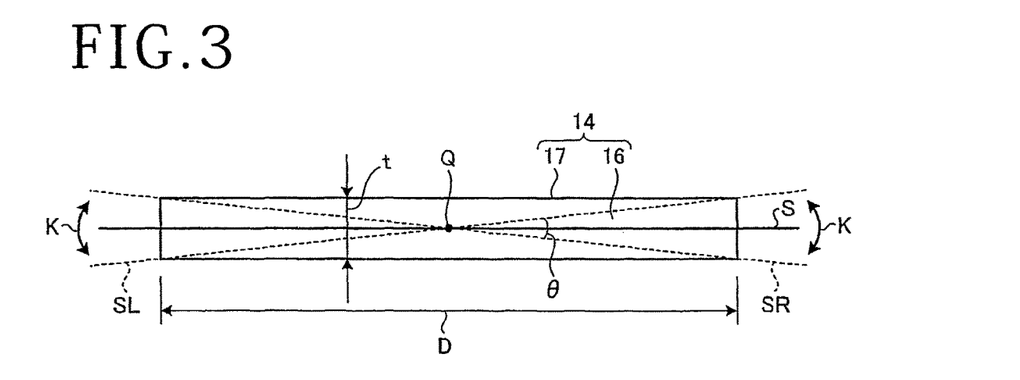
FIG. 3 is a diagram showing mechanical deflection angle of the scanning mirror when the resonant scanner is driven.

FIG. 1 is a perspective view showing a configuration example of a resonant scanner including a scanning mirror according to the present embodiment. FIG. 2 is a schematic view showing a configuration example of a drive unit of the resonant scanner. FIG. 3 is a view showing a mechanical deflection angle of the scanning mirror when the resonant scanner is driven. As illustrated in FIG. 1, the resonant scanner (scanner apparatus) 1 includes a base section 11, a shaft 12 fixed to the base section 11, and a scanning mirror 14 supported at a tip portion of the shaft 12 through a pedestal 13. The resonant scanner 1, so called generally, performs scanning by putting the scanning mirror 14 into a resonating motion about the axis of the shaft 12.

The base section 11 is a section for holding the shaft 12 and the scanning mirror 14, and can be fixed at a predetermined installation site. The shaft 12 is attached to the base section 11 in an upright state. The shaft 12 is equipped with an arm section 15 extending in a direction orthogonal to the axis Q of the shaft 12. The arm section 15 includes tip portions 15*a* and 15*b* located on a straight line on opposite sides of the axis Q. The tip portions 15*a* and 15*b* are spaced by the same distance from the axis Q.

The scanning mirror 14 includes a mirror base 16 formed in a disk shape (plate-like shape), and a reflective film 17 formed on one side of the mirror base 16. The reflective film 17 is composed of a thin film of a metal such as aluminum or a multilayer film of a dielectric. The mirror base 16 is formed in a disk shape having a diameter (a maximum length in a width direction orthogonal to the axis Q) D of 5 to 15 mm (in this embodiment, 10 mm) and thickness t of 0.5 to 2.0 mm (in this embodiment, 1.0 mm). The material constituting the mirror base 16 will be described later. The scanning mirror 14 is supported, for example, by being clamped between a pair of pedestals 13 fixed to a tip portion of the shaft 12 or by adhesion.

In addition, the resonant scanner 1 is provided with a drive unit 30 that puts the scanning mirror 14 into a resonating motion about the axis Q, through the shaft 12. As depicted in FIG. 2, the drive unit 30 includes coils 31*a* and 31*b* wound around the above-mentioned arm section 15, with a spacing therebetween, a power source section 32 for applying an alternating current (AC) power to the coils 31*a* and 31*b*, and magnets 32*a* and 32*b* disposed respectively at the tip portions 15*a* and 15*b* of the arm section 15. The coils 31*a* and 31*b* are each configured by winding a single wire around the arm section 15 extending toward opposite sides of the axis Q.

The power source section 32 applies an AC power of a predetermined frequency (excitation frequency) to the coils 31*a* and 31*b*. In the coils 31*a* and 31*b*, the current flow direction is switched over at the predetermined frequency, whereby magnetic fields according to the current direction are generated. Therefore, in the tip portions 15*a* and 15*b* of the arm section 15 around which the coils 31*a* and 31*b* are wound, a magnetic pole is alternately switched over from an S pole to an N pole, and vice versa, according to the predetermined frequency. The magnets 32*a* and 32*b* are each configured by combining plural (in this embodiment, three) magnets. The magnet 32*a* has an N pole 32*a*N and an S pole 32*a*S disposed opposite to each other, with the tip portion 15*a* of the arm section 15 therebetween. In addition, the magnet 32*b* has an N pole 32*b*N and an S pole 32*b*S disposed opposite to each other, with the tip portion 15*b* of the arm section 15 therebetween. The N poles 32*a*N and 32*b*N are located on the same side in respective spaces partitioned by the arm section 15, whereas the S poles 32*a*S and 32*b*S are located on the side opposite to the N poles 32*a*N and 32*b*N.

In the present configuration, when an AC power of a predetermined frequency (excitation frequency) is applied to the coils 31*a* and 31*b*, the magnetic poles generated in the tip portions 15*a* and 15*b* of the arm section 15 and magnetic forces of the magnets 32*a* and 32*b* interact, whereby the shaft 12 is resonated (excited) in a circumferential direction (the direction of arrow K) about the axis Q. For this reason, as illustrated in FIG. 3, the scanning mirror 14 fixed to the shaft 12 is resonated (excited) about the axis Q, such that a reference line S extending in the widthwise direction of the scanning mirror 14 falls in a range between a clockwise direction limit line SR and a counterclockwise direction limit line SL. The angle between the clockwise direction limit line SR and the counterclockwise direction limit line SL between which the scanning mirror 14 is resonated is called mechanical deflection angle θ. Besides, while the drive unit 30 has the magnets 32*a* and 32*b* disposed respectively at the tip portions 15*a* and 15*b* of the arm section 15 in this embodiment, the magnets 32*a* and 32*b* may be replaced by iron cores.

Meanwhile, in the resonant scanner 1 configured as above, the scanning mirror 14 is resonated (excited) according to the excitation frequency applied. In the case of driving the scanning mirror 14 at a high speed by applying an excitation frequency in a high frequency range (for example, 10 kHz or above) in this configuration, a moment of inertia attendant on resonance acts on the scanning mirror 14, and, therefore, it is necessary to reduce this moment of inertia. If the diameter D (the maximum length in the widthwise direction) of the scanning mirror 14 (the mirror base 16) is reduced for the purpose of reducing the moment of inertia, however, an effective reflection range is accordingly reduced; for this reason, it is necessary to make smaller the beam diameter of a laser beam used in actual scanning. With the beam diameter being small, bad influences such as shortening of service life due to accumulation of damages and a thermal lens effect may be exerted on optical elements such as mirrors, lenses, etc. for guiding the laser beam to the scanning mirror 14. In addition, as the beam diameter of the laser beam is reduced, NA is lowered, which would make it difficult to enhance energy density and to apply the laser beam to a wider region.

Figure 4:
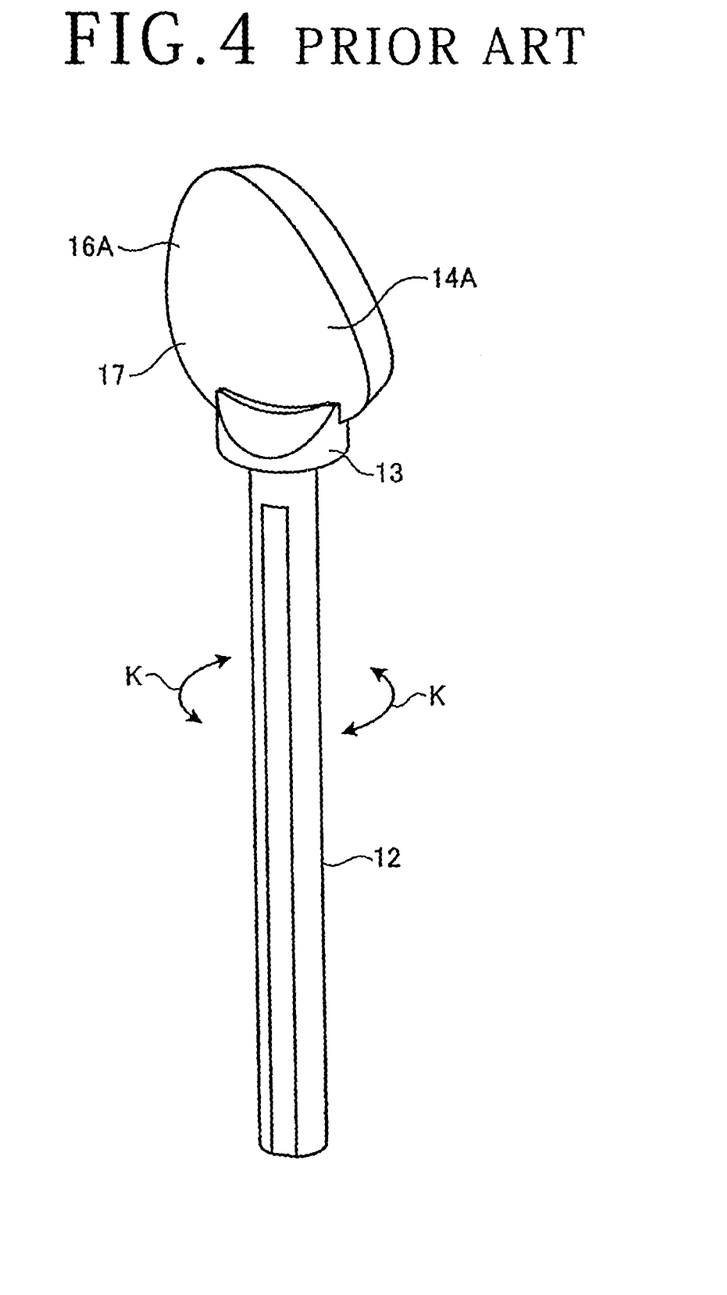
FIG. 4 is a perspective view showing a manner of flexure of a conventional scanning mirror at the time of driving.

For this reason, it has been attempted to realize a configuration for preventing the moment of inertia from increasing, while restraining a reduction in the effective reflection range of the scanning mirror 14 (the mirror base 16). In conventional scanning mirrors, the mirror base has been mainly formed of quartz glass, which is not a material having a sufficient rigidity. When a conventional scanning mirror 14A is driven at a high speed, its mirror base 16A may therefore undergo flexure, as shown in FIG. 4, possibly leading to a lowering in focusing characteristics. This problem becomes more conspicuous as the diameter D of the mirror base 16 (16A) increases, and as the scanning mirror 14 (14A) is driven at a higher speed and with a larger mechanical deflection angle θ (see FIG. 3).

In this configuration, the scanning mirror 14 includes a disk-shaped mirror base 16 having a diameter D of 10 mm and a thickness t of 1.0 mm, and a reflective film 17 formed as a thin film of aluminum on one side of the mirror base 16. The thickness of the reflective film 17 is negligibly small as compared to the thickness of the mirror base 16. The scanning mirror 14 is driven (excited) in such a range as to satisfy the condition of $f^2 \cdot \theta \geq 873$ krad/s$^2$, where f (kHz) is the excitation frequency, and θ (rad) is the mechanical deflection angle of the scanning mirror 14. The value of $f^2 \cdot \theta$ corresponds to a coefficient of acceleration, and serves as an index at the time of driving the scanning mirror 14 at a high speed and with a large mechanical deflection angle θ. In addition, the value of 873 krad/s$^2$ is a value when the scanning mirror 14 is excited at an excitation frequency f of 10 kHz and with a mechanical deflection angle θ of 0.5 degree, namely, π/360 rad; this condition corresponds to a region in which flexure is generated in a conventional scanning mirror. In the present configuration, it is an object to inhibit flexure of the scanning mirror 14 even when the scanning mirror 14 is driven in a region where $f^2 \cdot \theta$ is at least 873 krad/s$^2$.

The present inventor made extensive and intensive studies paying attention to the material of the mirror base 16, and found out that the value of specific rigidity (GPa·cm$^3$/g) determined by Young's modulus (GPa) and density (g/cm$^3$), of the material, is important. In this embodiment, non-metallic materials of diamond (specimen 1), sintered diamond (specimen 2), silicon carbide (specimen 3), sapphire (specimen 4), and quartz glass (specimen 5) are selected as specimens, and the mirror base 16 is formed by use of each of these non-metallic materials.

Figure 5:
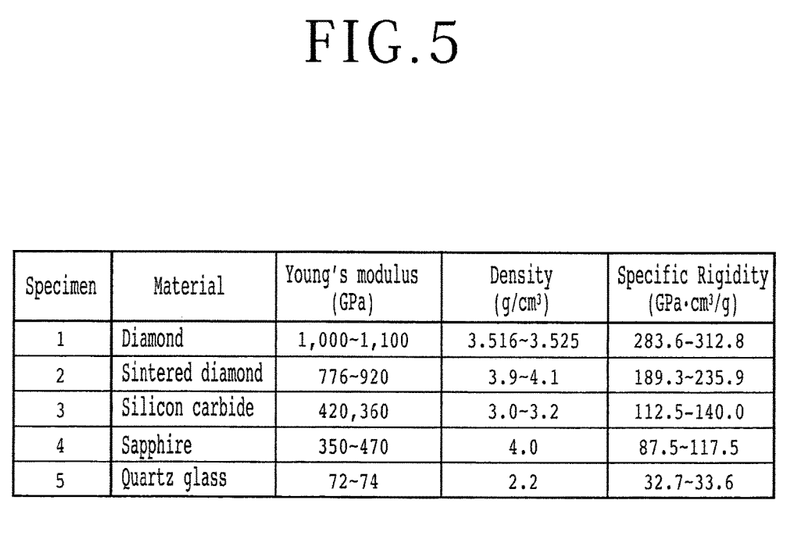
FIG. 5 is a table showing Young's modulus, density, and specific rigidity of specimens.

FIG. 5 shows a table in which Young's modulus, density, and specific rigidity of each specimen are set forth. In FIG. 5, values measured under a predetermined temperature condition (for example, around 25° C.) are shown. Diamond is one of the allotropes of carbon, and may be a single crystal or polycrystalline. The sintered diamond is a material obtained by sintering diamond particles into a cohesive state. Silicon carbide is a compound of carbon with silicon, and is widely used as material for semiconductor substrates. Sapphire is a crystal of aluminum oxide. Quartz glass is a glass formed from silicon dioxide (SiO$_2$). As shown in FIG. 5, specimens 1 to 5 have values of specific rigidity which decrease in this order. Specimens 1 to 3 have specific rigidity values of not less than 100 GPa·cm$^3$/g, while specimens 4 and 5 have specific rigidity values of less than 100 GPa·cm$^3$/g. Note that in FIG. 5, sapphire constituting specimen 4 includes those which have a specific rigidity value of not less than 100 GPa·cm$^3$/g, and those which have a specific rigidity value of less than 100 GPa·cm$^3$/g, depending on the production method, composition or the like thereof.

Now, Examples of the present invention and Prior Art Examples will be described. Using each of the materials of specimens 1 to 5 mentioned above, a disk-shaped mirror base 16 having a diameter D of 10 mm and a thickness t of 1.0 mm is formed, and the amount of flexure generated when the mirror base 16 is excited under predetermined conditions is computed by a simulation. Here, the amount of flexure is the maximum amount of flexure in a region of a center diameter 5 mm of the mirror base 16, and was simulated by use of SOLID WORKS (registered trademark).

EXAMPLE 1

In Example 1, diamond having a specific rigidity of 283.6 GPa·cm$^3$/g was used as material for the mirror base 16. The amount of flexure when the mirror base 16 is excited at an excitation frequency of 7 kHz and with a mechanical deflection angle of π/360 rad and a He—Ne laser beam of a wavelength λ of 632 nm is applied to the mirror base 16 was obtained. The value of $f^2 \cdot \theta$ in this case is 427 krad/s$^2$. Acceptability was determined based on the amount of flexure. When the amount of flexure was less than a predetermined reference value (the wavelength λ of the He—Ne laser beam), the material was determined to be acceptable (○), since the flexure does not hinder the scanning of the laser beam. When the amount of flexure was not less than the reference value (the wavelength λ), the material was determined to be unacceptable (x). This reference value is determined based on the fact that in general, measurement of surface accuracy of optical elements is performed using interference of He—Ne laser.

EXAMPLE 2

In Example 2, sintered diamond having a specific rigidity of 189.3 GPa·cm$^2$/g was used as material for the mirror base 16. The other conditions were the same as in Example 1.

EXAMPLE 3

In Example 3, silicon carbide having a specific rigidity of 112.5 GPa·cm$^3$/g was used as material for the mirror base 16. The other conditions were the same as in Example 1.

EXAMPLE 4

In Example 4, sapphire having a specific rigidity of 87.5 GPa·cm$^3$/g was used as material for the mirror base 16. The other conditions were the same as in Example 1.

PRIOR ART EXAMPLE 1

In Prior Art Example 1, quartz glass having a specific rigidity of 32.7 GPa·cm$^3$/g was used as material for the mirror base 16. The other conditions were the same as in Example 1.

EXAMPLE 5

In Example 5, the mirror base 16 was excited at an excitation frequency of 10 kHz and with a mechanical deflection angle of π/360 rad. The value of $f^2 \cdot \theta$ in this case is 873 krad/s$^2$. The other conditions were the same as in Example 1.

EXAMPLE 6

In Example 6, the mirror base 16 was excited at an excitation frequency of 10 kHz and with a mechanical deflection angle of π/360 rad. The value of f²·θ in this case is 873 krad/s². The other conditions were the same as in Example 2.

EXAMPLE 7

In Example 7, the mirror base 16 was excited at an excitation frequency of 10 kHz and with a mechanical deflection angle of π/360 rad. The value of f²·θ in this case is 873 krad/s². The other conditions were the same as in Example 3.

EXAMPLE 8

In Example 8, the mirror base 16 was excited at an excitation frequency of 10 kHz and with a mechanical deflection angle of π/360 rad. The value of f²·θ in this case is 873 krad/s². The other conditions were the same as in Example 4.

PRIOR ART EXAMPLE 2

In Prior Art Example 2, the mirror base 16 was excited at an excitation frequency of 10 kHz and with a mechanical deflection angle of π/360 rad. The value of f²·θ in this case is 873 krad/s². The other conditions were the same as in Prior Art Example 1.

EXAMPLE 9

In Example 9, the mirror base 16 was excited at an excitation frequency of 14 kHz and with a mechanical deflection angle of π/360 rad. The value of f²·θ in this case is 1,710 krad/s². The other conditions were the same as in Example 1.

EXAMPLE 10

In Example 10, the mirror base 16 was excited at an excitation frequency of 14 kHz and with a mechanical deflection angle of π/360 rad. The value of f²·θ in this case is 1,710 krad/s². The other conditions were the same as in Example 2.

EXAMPLE 11

In Example 11, the mirror base 16 was excited at an excitation frequency of 14 kHz and with a mechanical deflection angle of π/360 rad. The value of f²·θ in this case is 1,710 krad/s². The other conditions were the same as in Example 3.

EXAMPLE 12

In Example 12, the mirror base 16 was excited at an excitation frequency of 14 kHz and with a mechanical deflection angle of π/360 rad. The value of f²·θ in this case is 1,710 krad/s². The other conditions were the same as in Example 4.

Prior Art Example 3

In Prior Art Example 3, the mirror base 16 was excited at an excitation frequency of 14 kHz and with a mechanical deflection angle of π/360 rad. The value of f²·θ in this case is 1,710 krad/s². The other conditions were the same as in Prior Art Example 1.

Figure 6:
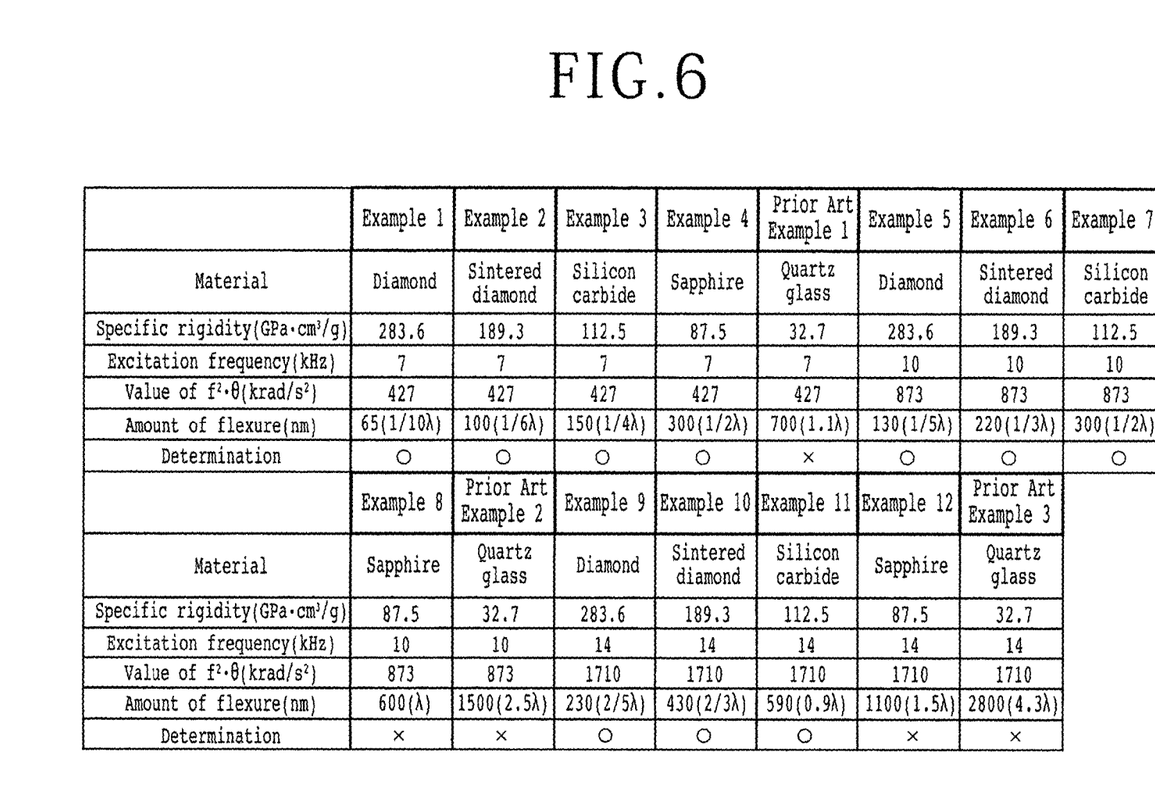
FIG. 6 is a table in which experimental results (simulation results) are summarized.

FIG. 6 shows a table in which the experimental results (simulation results) are summarized. As shown in FIG. 6, in Examples in which the specimens 1 to 3 having a specific rigidity of not less than 100 GPa·cm³/g were used, the amount of flexure could be suppressed to below the reference value (the wavelength A of the He—Ne laser beam) and, therefore, a good result of acceptability determination was obtained, not only in the region where the value of f²·θ is less than 873 krad/s² but also in the region where the value of f²·θ is not less than 873 krad/s². Furthermore, though not set forth in FIG. 6, when the mirror bases 16 formed respectively from diamond and sintered diamond were excited at an excitation frequency of 15 kHz and with a mechanical deflection angle of π/360 rad (with the value of f²·θ being 1,963 krad/s²), also, the amount of flexure could be suppressed to below the reference value. Specifically, the amount of flexure in the case of diamond was 300 nm (½λ), and the amount of flexure in the case of the sintered diamond was 500 nm (⅘λ); thus, the amount of flexure could be suppressed to below the reference value in both cases.

On the other hand, in Examples and Prior Art Examples in which the specimens 4 and 5 having a specific rigidity of less than 100 GPa·cm³/g were used, a considerable flexure was generated in the mirror base 16 and, therefore, a good result of acceptability determination could not be obtained, in the region where the value of f²·θ was not less than 873 krad/s². Specifically, in Examples in which the specimen 4 (sapphire) was used, the amount of flexure could be suppressed to below the reference value in a region where the value of f²·θ was comparatively small (f²·θ≤427 krad/s²), but the amount of flexure exceeded the reference value in the region where the value of f²·θ was not less than 873 krad/s².

From the above results, it was found that the amount of flexure of the mirror base 16 differs depending on not only the Young's modulus but also the specific rigidity, and that the amount of flexure is suppressed to or below a predetermined reference value if the specific rigidity is not less than 100 GPa·cm³/g. In other words, where diamond, sintered diamond, and silicon carbide are used as material for the mirror base 16, it is possible to suppress the flexure of the mirror base 16 at the time of driving and to realize an enhanced focusing characteristic. Therefore, a reduction in the size of the scanning mirror 14 attendant on driving at such a high speed that the value of f²·θ is not less than 873 krad/s² can be restrained or suppressed, and a laser beam of a sufficiently large beam diameter can be used for laser processing. In this configuration, the value of specific rigidity is preferably 100 to 350 GPa·cm³/g. This is because a material having a specific rigidity of more than 350 GPa·cm³/g is difficult to be processed into a mirror base.

Figure 7:
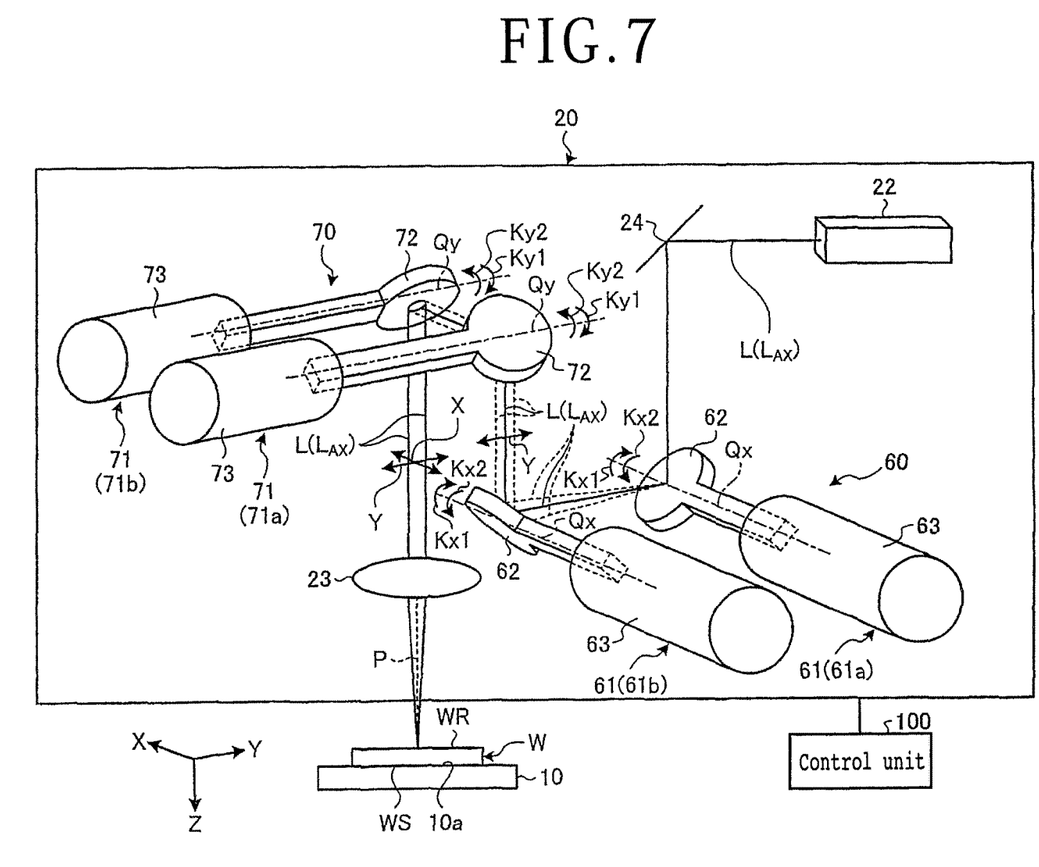
FIG. 7 is a view showing a configuration example of a laser beam applying apparatus to which the resonant scanner is applied.
Figure 8:
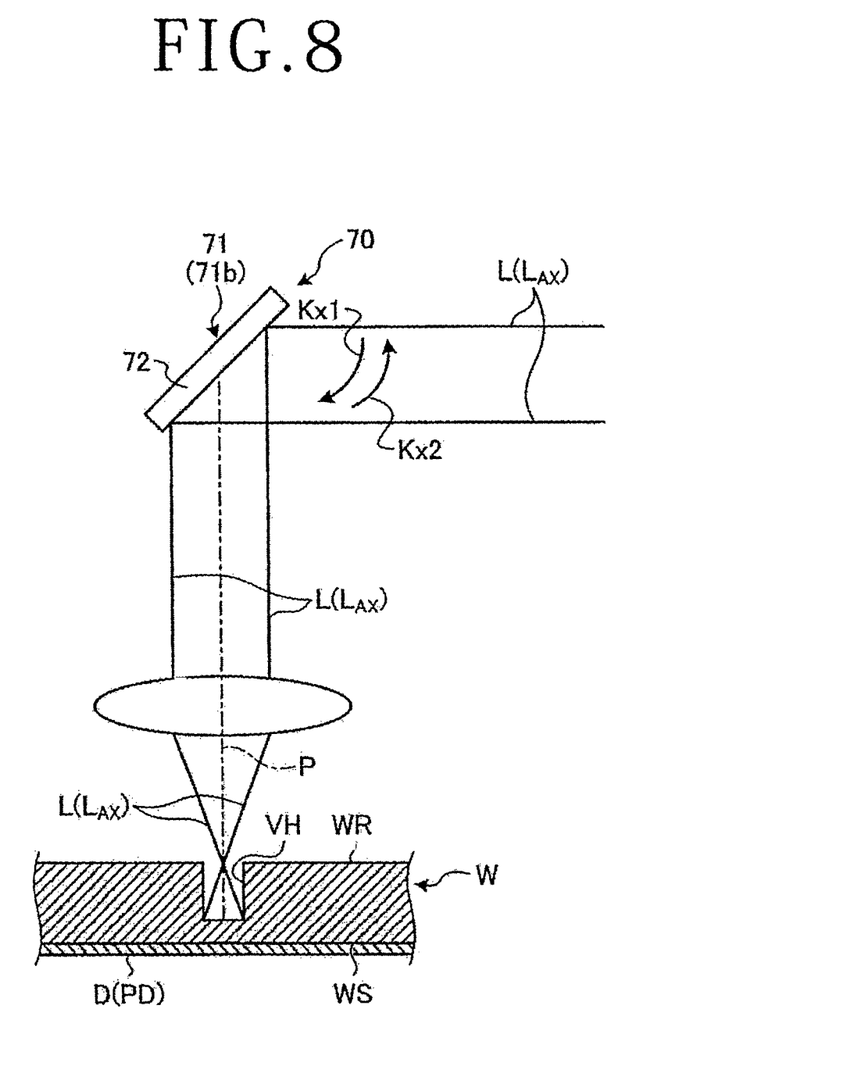
FIG. 8 is a sectional view showing a state in which a workpiece is drilled by a laser beam emitted from the laser beam applying apparatus.

Now, an application example of the resonant scanner as above-mentioned will be described below. FIG. 7 is a view showing a configuration example of a laser beam applying apparatus to which the resonant scanner is applied. FIG. 8 is a sectional view showing a state in which a workpiece is drilled by a laser beam emitted from the laser beam applying apparatus. The laser beam applying apparatus 20 is provided, for example, in a laser processing apparatus (not illustrated) that drills a wafer W as a workpiece. The wafer W is, for example, a disk-shaped semiconductor wafer or optical device wafer formed by use of silicon, sapphire, gallium or the like as a base material.

As illustrated in FIG. 7, the laser beam applying apparatus 20 includes a laser oscillator 22 (laser beam oscillating means), a focusing lens 23, first optical axis decentering means 60, second optical axis decentering means 70, a mirror 24, and a control unit 100. The laser oscillator 22 oscillates a laser beam L of such a wavelength (for example, 355 nm) as to be absorbed in the wafer W. The focusing lens 23 is provided to face a holding surface 10a of a chuck table 10. The focusing lens 23 focuses the laser beam L oscillated from the laser oscillator 22 on the wafer W held on the chuck table 10. Note that in this configuration, a nanosecond laser beam or a picosecond laser beam can be used as the laser beam L. For obtaining a cleaner processed shape, however, it is preferable to use a picosecond laser beam.

As shown in FIG. 7, the first optical axis decentering means 60 has a pair of first axis resonant scanners 61 (corresponding to the above-mentioned resonant scanner 1) which are disposed on the downstream side of the laser oscillator 22 with respect to the traveling direction of the laser beam L and by which the optical axis $L_{AX}$ of the laser beam L is reciprocally oscillated in a Y-axis direction (corresponding to the first axis direction) in relation to the center axis P (depicted in FIG. 7) of the focusing lens 23. The pair of first axis resonant scanners 61 are spaced apart in the Y-axis direction. The first axis resonant scanner 61 includes a flat plate-shaped mirror 62 (corresponding to the above-mentioned scanning mirror 14) provided to be rotatable about an axis Qx parallel to an X-axis direction, and a scanning section 63 (corresponding to the above-mentioned scanning mirror 14) which rotates the mirror 62 about the axis Qx by a resonating motion.

On the mirror 62 of the first axis resonant scanner 61 on one side (hereinafter denoted by reference sign 61a), a laser beam L oscillated by the laser oscillator 22 is incident, through a mirror 24 which is disposed between the laser oscillator 22 and the first optical axis decentering means 60. The mirror 62 of the first axis resonant scanner 61a on one side reflects the laser beam L toward the first axis resonant scanner 61 on the other side (hereinafter denoted by reference sign 61b). The mirror 62 of the first axis resonant scanner 61b on the other side reflects the laser beam L toward the second optical axis decentering means 70.

As shown in FIG. 7, the second optical axis decentering means 70 has a pair of second axis resonant scanners 71 (corresponding to the above-mentioned resonant scanner 1) which are disposed between the first optical axis decentering means 60 and the focusing lens 23 and by which the optical axis $L_{AX}$ of the laser beam L is reciprocally oscillated in the X-axis direction (corresponding to the second axis direction) in relation to the center axis P of the focusing lens 23. The pair of second axis resonant scanners 71 are spaced apart in the X-axis direction. The second axis resonant scanner 71 includes a flat plate-shaped mirror 72 (corresponding to the above-mentioned scanning mirror 14) provided to be rotatable about an axis Qy parallel to the Y-axis direction, and a scanning section 73 (corresponding to the above-mentioned scanning mirror 14) which rotates the mirror 72 about the axis Qy by a resonating motion.

On the mirror 72 of the second axis resonant scanner 71 on one side (hereinafter denoted by reference sign 71a), the laser beam L reflected by the mirror 62 of the first axis resonant scanner 61b on the other side is incident. The mirror 72 of the second axis resonant scanner 71a on the one side reflects the laser beam L toward the second axis resonant scanner 71 on the other side (hereinafter denoted by reference sign 71b). The mirror 72 of the second axis resonant scanner 71b on the other side reflects the laser beam L toward the focusing lens 23.

The laser beam applying apparatus 20 excites the first axis resonant scanners 61a and 61b and the second axis resonant scanners 71a and 71b, with a predetermined phase difference (90°) fixed therebetween. By this operation, as shown in FIG. 8, a through-hole VH extending from a back side WR of the wafer W, at a position where a bonding pad PD is formed on a front side WS of the wafer W, to reach the bonding pad PD is formed. The laser beam applying apparatus 20 is configured in such a manner that the mirrors 62 of the first axis resonant scanners 61a and 61b and the mirrors 72 of the second axis resonant scanners 71a and 71b are driven respectively about the axes Qx and Qy by the scanning sections 63 and 73, whereby the laser beam L can be made to be eccentric, and the through-hole VH can be formed at a desired part of the front side WS of the wafer W.

As has been described above, the scanning mirror 14 in this embodiment includes the mirror base 16 and the reflective film 17 formed on the mirror base 16, and the mirror base 16 is formed from a non-metallic material having a specific rigidity, determined by Young's modulus and density, of at least 100 GPa·cm³/g. Therefore, it is possible to restrain or suppress flexure of the mirror base 16, when the scanning mirror 14 is driven at a high frequency, for example, 10 kHz or above, and to realize an enhanced focusing characteristic.

Accordingly, it is possible to restrain or suppress a reduction in the size of the scanning mirror 14 attendant on driving at a high speed, and to use a laser beam of a sufficiently large beam diameter for laser processing. As a result, it is possible to realize an enhanced degree of freedom in design and a lowered cost as to light guiding optical elements such as the focusing lens 23 and the mirror 24. In addition, since the laser beam can have a sufficiently large beam diameter, a higher energy density owing to an enhanced NA at the processing point can be realized, so that finer processing and wider-range processing can be achieved.

Besides, the scanning mirror 14 in this embodiment is driven in a region where the value of $f^2 \cdot \theta$ is at least 873 krad/s², where f (kHz) is the excitation frequency for the scanning mirror 14 and θ (rad) is the mechanical deflection angle of the mirror base 16. Therefore, flexure of the mirror base 16 can be restrained or suppressed and the focusing characteristic can be enhanced, even in a higher speed region, as compared to the conventional configurations. In addition, since the non-metallic material is diamond or silicon carbide, the mirror base 16 can be formed easily.

Note that the present invention is not limited to the above-described embodiments, and various modifications are possible without departing from the spirit or scope of the gist of the invention. For instance, while the scanning mirror 14 has been provided in the resonant scanner 1 in the above embodiment, the scanning mirror 14 may be provided in a galvano scanner so long as the scanning mirror 14 is excited at a high frequency.

In addition, while the laser beam applying apparatus 20 to which the resonant scanner 1 is applied has been used to form a through-hole in the above embodiment, the laser beam applying apparatus 20 may be used to process a workpiece into other shape than a through-hole, such as, for example, a groove.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A scanning mirror comprising:
A disk shaped mirror base; and
a reflective film formed directly across an entire surface of the mirror base, wherein the mirror base is formed from a non-metallic material having a specific rigidity, determined by Young's modulus and density, of at least 100 GPa·cm$^3$/g; and wherein the scanning mirror is resonated about a rotational axis via a shaft connected to a drive unit.

2. The scanning mirror according to claim 1, which is driven at a value of f$^2$·θ in a region of not less than 873 krad/s$^2$, where f (kHz) is an excitation frequency for driving the scanning mirror, and θ(rad) is a mechanical deflection angle of the mirror base.

3. The scanning mirror according to claim 1, wherein the non-metallic material is diamond or silicon carbide.

4. The scanning mirror according to claim 1, wherein the mirror base is used as a resonant scanner or a galvano scanner.

* * * * *